(12) United States Patent
Akers et al.

(10) Patent No.: US 8,444,191 B2
(45) Date of Patent: May 21, 2013

(54) REMOVABLE AUTOMOBILE MOLDING FOR DENT AND SCRATCH PROTECTION

(76) Inventors: Douglas William Akers, Idaho Falls, ID (US); Ute Silvia Coggin, Tucson, AZ (US)

( * ) Notice: Subject to any disclaimer, the term of this patent is extended or adjusted under 35 U.S.C. 154(b) by 12 days.

(21) Appl. No.: 13/071,909

(22) Filed: Mar. 25, 2011

(65) Prior Publication Data

US 2012/0242102 A1    Sep. 27, 2012

(51) Int. Cl.
  *B60R 19/42*    (2006.01)
(52) U.S. Cl.
  USPC ............................................. 293/128
(58) Field of Classification Search
  USPC ............... 293/128; 296/136.07, 207; 428/31, 428/900; 49/374; 280/770
  See application file for complete search history.

(56) References Cited

U.S. PATENT DOCUMENTS

| | | | | |
|---|---|---|---|---|
| 1,516,489 A | * | 11/1924 | Barton | 24/523 |
| 2,048,461 A | * | 7/1936 | Mosgoffian | 150/166 |
| 2,889,165 A | * | 6/1959 | Zientara | 293/1 |
| 3,131,960 A | * | 5/1964 | Popp | 293/1 |
| 3,147,176 A | * | 9/1964 | Haslam | 428/55 |
| 3,243,223 A | * | 3/1966 | Hoshell | 49/460 |
| 3,582,134 A | * | 6/1971 | Shaff | 293/128 |
| 3,795,410 A | * | 3/1974 | Huber | 280/784 |
| 3,865,358 A | * | 2/1975 | Butters | 267/140 |
| 4,014,583 A | * | 3/1977 | Forbes | 293/128 |
| 4,127,294 A | * | 11/1978 | Cooper | 293/120 |
| 4,401,331 A | * | 8/1983 | Ziner et al. | 293/128 |
| 4,437,697 A | * | 3/1984 | Hinojos | 293/118 |
| 4,690,446 A | | 9/1987 | Warren | 293/128 |
| 4,810,013 A | | 3/1989 | Spears | 293/128 |
| 4,828,302 A | | 5/1989 | Marasigan, Jr. | 293/128 |
| 4,879,543 A | * | 11/1989 | Smith, Sr. | 340/473 |
| 4,969,674 A | * | 11/1990 | Wagner | 293/128 |
| 4,991,891 A | * | 2/1991 | Karshens | 293/128 |
| 5,050,925 A | * | 9/1991 | Brown | 296/136.03 |
| 5,060,994 A | * | 10/1991 | Martin et al. | 293/128 |
| 5,071,181 A | * | 12/1991 | Wagner | 293/128 |
| 5,149,166 A | | 9/1992 | Wille et al. | 293/128 |
| 5,156,425 A | * | 10/1992 | Wagner | 293/128 |
| 5,184,857 A | | 2/1993 | Hawkins | 293/128 |

(Continued)

FOREIGN PATENT DOCUMENTS

| | | | |
|---|---|---|---|
| JP | 57151423 A | 9/1982 | |
| JP | 05069783 A | 3/1993 | |

OTHER PUBLICATIONS

Office Action, U.S. Appl. No. 13/506,261 (14 pgs).

*Primary Examiner* — Glenn Dayoan
*Assistant Examiner* — Pinel Romain
(74) *Attorney, Agent, or Firm* — Hayes Soloway P.C.

(57) ABSTRACT

A removable automobile molding has been developed that is an extruded plastic assembly, which attaches to the sides or fronts of the vehicle using a flexible magnetic film and can protect any surface of the automobile from dents or scratches. The flexible-plastic, guard assemblies are sized for each vehicle to allow car doors to be opened or closed with the assemblies attached and can be left on the vehicle either temporarily or permanently. Theft of the extruded plastic assemblies is prevented due to the use of spring-loaded clips attached to the extruded plastic assembly, which attach to the edges of the door and cannot be removed unless the door is open. For some vehicles the theft protection assembly may not be required or cannot be attached to the vehicle.

7 Claims, 3 Drawing Sheets

U.S. PATENT DOCUMENTS

| | | | |
|---|---|---|---|
| 5,286,536 A * | 2/1994 | Gross et al. | 428/31 |
| 5,520,765 A * | 5/1996 | Zoller | 156/245 |
| 5,740,993 A * | 4/1998 | Siepe-Noll | 296/146.6 |
| 5,762,374 A | 6/1998 | Grove et al. | 280/847 |
| 5,975,599 A * | 11/1999 | Goldstein | 293/128 |
| 6,179,354 B1 * | 1/2001 | Bennett, Jr. | 293/128 |
| 6,186,564 B1 * | 2/2001 | Ashcroft | 293/128 |
| 6,247,742 B1 * | 6/2001 | Boudreaux | 296/57.1 |
| 6,572,163 B1 | 6/2003 | Pickett | 293/142 |
| 6,926,339 B2 * | 8/2005 | Gentile | 296/136.07 |
| 6,955,383 B2 * | 10/2005 | Cano | 293/128 |
| 6,971,693 B1 | 12/2005 | Richardson | 293/128 |
| 7,073,830 B1 | 7/2006 | Chen et al. | 293/142 |
| 7,229,108 B2 | 6/2007 | Hochrein | 293/128 |
| 7,740,294 B2 | 6/2010 | Malina et al. | 293/142 |
| 7,763,332 B2 * | 7/2010 | Denet | 428/31 |
| 8,162,383 B2 | 4/2012 | Curtis | 296/180.4 |
| 2007/0158963 A1 | 7/2007 | Debs | 293/128 |
| 2010/0276951 A1 | 11/2010 | Malina et al. | 293/142 |

* cited by examiner

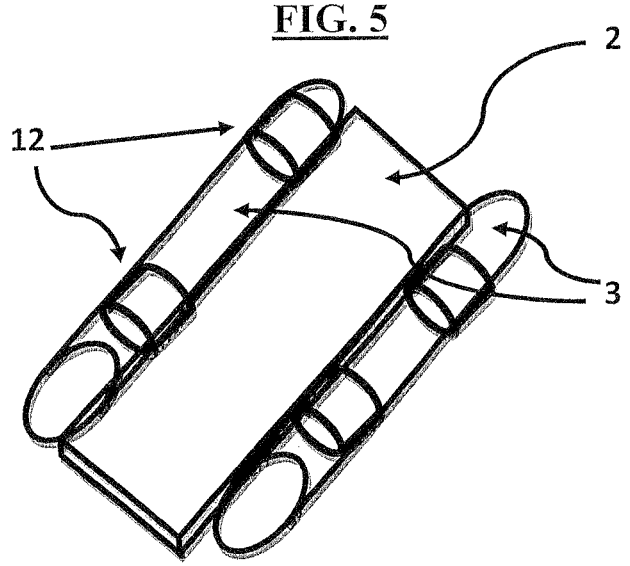

REMOVABLE AUTOMOBILE MOLDING FOR DENT AND SCRATCH PROTECTION

CROSS REFERENCE TO RELATED INVENTIONS

Not Applicable

STATEMENT OF FEDERALLY SPONSORED RESEARCH/DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

1. Field of the Invention

This invention relates to the field of removable moldings that are used to protect vehicle doors or car surfaces from denting and scratching. Specifically, the present invention relates to magnetically-attached removable vehicle moldings which protect the front, back or sides of the vehicle, so that when the vehicle is parked there will be an extruded plastic molding in place to protect the vehicle from being damaged when the doors of neighboring vehicles are opened. The present invention provides easily removable moldings that can be left in place even when the vehicle is moved from location to location and will prevent the automobile from being damaged. The plastic assemblies are sized for each vehicle to allow car doors to be opened or closed with the assemblies attached and the vehicle can be moved from location with the protection attached or it can be left on permanently.

This invention also has several types of locking assemblies that prevent the extruded plastic assembly from being removed from the car unless the door is open. The invention can be used with or without the locking mechanism if theft is not of concern.

2. Description of the Prior Art

The concept of moldings for the sides of vehicles has been seen in the prior art. Several patents exist which protect the side of a vehicle from scratches and dents. Many of these patents are removable side protection devices which are hooked into the wheel well of the vehicle and are composed of bulky pads that protect the vehicle and must be removed prior to driving the vehicle

Discussion of Prior Art Patents And Comparison To The Present Invention

The following ten patents are the closest prior art of which the inventor is aware.

1. U.S. Pat. No. 4,002,363 issued to James on Jan. 11, 1977 for "Automotive Body Protective Apparatus". ("James" Patent)
2. U.S. Pat. No. 4,561,685 issued to Fischer on Dec. 31, 1985 for "Protective Pad for Side of Motor Vehicle". ("Fischer Patent")
3. U.S. Pat. No. 4,810,013 issued to Spears on Mar. 7, 1989 for "Door Guard". ("Spears Patent")
4. French Patent No. 1,077,058 issued to Schwob on Nov. 4, 1954 for "Dispositif de Protection Laterale pour Voitures Automobiles et Autres Vehicules". ("Schwob French Patent")
5. U.S. Pat. No. 4,674,783 issued to Hogan on Jun. 23, 1987 for "Removable Automobile Body Protective Guard with Lockable Attachment". ("Hogan Patent")
6. U.S. Pat. No. 4,401,331 issued to Ziner et al. on Aug. 30, 1983 for "Automobile Door Guard". ("Ziner Patent")
7. U.S. Pat. No. 4,437,697 issued to Hinojos on Mar. 20, 1984 for "Retractable Automobile Sideguard". ("Hinojos Patent")
8. U.S. Pat. No. 4,493,502 issued to Campbell on Jan. 15, 1985 for "Car Body Guard". ("Campbell Patent")
9. U.S. Pat. No. 4,991,891 issued to Karshens on Feb. 12, 1991 for "Removable Locking Side Guard for Vehicle Protection". ("Karshens Patent")
10. U.S. Pat. No. 5,071,181 issued to Wagner on Dec. 10, 1991 for "Securement for a Resilient Vehicle Side Bumper". ("Wagner Patent")

The James Patent discloses an automotive body protective apparatus comprised of a plurality of separate elongated tubular members where a resilient interconnecting means is used for interconnection. A hook means is used to engage a body portion of the automobile which defines a wheel opening.

In comparison to the present invention, the relative complexity of the James Patent apparatus, due to the number of interconnecting parts involved in the construction of the apparatus, tend to complicate its manufacturability and diminish the potential benefits to the consumer as a low cost apparatus for protecting the door against indentations from other vehicles.

The present invention has a unique construction as an extruded plastic assembly that can be specifically sized for individual vehicles as is far different than any of the identified patents and provides a much simpler method of attaching the assembly to the vehicle in contrast to those identified. These basic features of this proposed patent, is easily manufacturable and provides the consumer with a desirable and practical apparatus which accomplishes the task of protecting the sides of the vehicle in a straightforward, less complicated manner.

In addition, since manufacturing costs would be much lower in the present invention, as compared to the James Patent, attributed to the plastic extrusion process, which utilizes available a straightforward extrusion process for manufacture, with a simple assembly, the lower manufacturing costs could be passed over to the consumer thereby providing a less expensive means for protecting the sides of a vehicle.

The Wagner Patent discloses a securement for a resilient vehicle side bumper which includes a hollow for an expandable bungee type member with fastening attachments at the terminal ends which include locking devices. The method of protection in the Wagner Patent is to use a bumper configuration which is connected to a cylindrical body having an arcuate or bowed passageway for the elastic member.

In comparison, the present invention has an extruded design and is attached by magnets to the automobile. This system allows the door protection to be left in place either temporarily or permanently.

The Fischer Patent discloses a protective pad for the side of a motor vehicle. The hollow plastic pipe is encased with foam. The means for suspending the hollow plastic pipe is by flexible belts which hang in a generally inverted Y shaped configuration and which is attached to the door of the vehicle.

The Spears Patent discloses a removable door guard attachable to a vehicle by means of hook members and is comprised of a plurality of spaced, elongated members which protect the vehicle.

The Schwob French Patent discloses spaced apart cushioning members attached from end to end of the car.

The Hogan Patent discloses a removable automobile body protective guard with lockable attachment. The attachment is a clamping device which attaches to the wheel wells. A shock cord is mounted from the point of the clamping device attachment.

The Ziner Patent discloses an automobile door guard which comprises telescopic, spring-urged tubes and a locking structure to lock the tubes at a selected length.

The Hinojos Patent discloses a retractable automobile sideguard which includes a first and second telescoping assembly which is pivoted to an upright position for usage.

The Campbell Patent discloses a car body guard which is comprised of a flexible rubber strap which rolls up in a housing and is mounted in one of the wheel wells of the car.

The Karshens Patent discloses a removable locking side guard for vehicle protection. The guard has a pivoting arm connected by a clamp for securing it to the vehicle.

Therefore, none of the prior art has combined the concept of having: an extruded plastic assembly to protect the vehicle that is attached to the vehicle with magnets and can be used on both doors and areas of the vehicle with no doors present. Further, this molding can be used either temporarily or permanently as a car protection and does not affect use of the vehicle or require it to be removed when the vehicle is opened or closed.

BRIEF SUMMARY OF THE INVENTION

The present invention relates to an extruded plastic assembly, which attaches to the sides or fronts of the vehicle using an attached flexible magnetic film next to the car and functions as a bumper on doors or other parts of the vehicle to prevent damage from other automobiles when doors are opened or when other vehicles may touch the protected vehicle. The primary configuration of the plastic assembly is such that it can be attached to any area of the vehicle where damage from other vehicles might occur such as the front or back or surfaces such as the sides of pickups or SUVs where no physical points of attachment may be present. The plastic assemblies are sized for each vehicle to allow car doors to be opened or closed with the assemblies attached and the vehicle can be moved from location with the protection attached or it can be left on permanently. The plastic assemblies will be provided in a range of generic or custom colors at the request of the purchaser.

Theft of the extruded plastic assembly is prevented due to the use of spring loaded clips attached to the hollow core tubes or flat plate of the extruded plastic assembly that cannot be removed unless the car door is open. The spring-loaded clip assemblies can be replaced with a cable extending through one of the extruded hollow tubes and that has a clip on each end to lock the assembly to the car. A spring or elastic tensioner may be added to the cable to take up slack in the cable. For some vehicles the theft protection assembly may not be required or cannot be attached to the vehicle.

The present invention provides a much better method of protecting cars surfaces from scratching or denting than the prior art and be left in place either temporarily or permanently, can be easily manufactured as an extruded plastic assembly and is in a low cost configuration, so that the surfaces of the vehicle are protected at a low cost to the user.

BRIEF DESCRIPTION OF THE SEVERAL VIEWS OF THE DRAWING

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring particularly to the drawings for the purpose of illustration only and not limitation, there is illustrated:

FIG. 5 is a perspective drawing showing individual magnets located inside the hollow tubes and attached to the assembly.

Referring to FIG. 1, there is shown a perspective view of the removable side molding to protect a car door. The molding is customized for each vehicle and extends to the edges of the door. The same device will also attach to a section of a truck or SUV in a similar fashion. It can also attach to the front and back of the car. Item 1 is a representative vehicle door. Item 2 is the representative extruded plastic assembly with 2 hollow tube door bumpers extruded with the base plate, which is adhesively attached to a flexible magnetic plate 20. Item 3 shows 2 hollow bumpers that are extruded with the base plate. Multiple bumpers may be needed for some applications. Item 4 shows the spring-loaded clip assemblies, one on each end of assembly that lock the assembly to the car door when the door is closed.

Referring to FIG. 2, there is a perspective view showing the extruded tube and plate assembly with a high-strength flexible magnetic plate adhesively attached to the bottom of the extruded plastic assembly. Item 2 is the representative extruded plastic assembly with 2 hollow tube door bumpers extruded with the base plate, Item 3 shows the 2 hollow tubes that were extruded with the base plate and Item 5 shows the base plate to which a flexible magnetic plate is attached adhesively or bonded to the plastic plate and which magnetically couples the assembly to the surface of the automobile.

Referring to FIG. 3, there is an exploded perspective view showing the spring clip assembly used to attach the molding assembly to a car door. Item 3 is one of the 2 hollow door bumpers attached to the extruded plastic plate. Item 4 shows the overall spring clip assembly that is adhesively or bonded to the inner wall of the hollow door bumper. Item 6 shows the spring clip housing, which is a tube with the inner end closed. The spring (Item 7) is permanently attached to the closed end of the tube either using adhesives or mechanically. Item 7 is attached to a thin cable (Item 8) that attaches to the clip (Item 9), which attaches the entire assembly to the car door. The spring assembly is located at the ends of the extruded plastic assembly so that there will be tension on the springs on each end of the extruded assembly when the assembly is attached at both ends to the car door. Item 9, the spring clip, has a lip on the spring clip such that when the clip is attached to the car door and the door is closed, that the spring clip cannot be removed through the gap between the door and the door housing. The spring clip is configured with minimal sharp edges and with a plastic coating so that no damage to the car door occurs. The entire assembly is sufficiently robust so that the assembly cannot be easily removed and is protected from theft.

Referring to FIG. 4, there is a perspective view showing a cable assembly rather than the locking clip assemblies. Items 2, 3 and 5 show the extruded plastic assembly and Item 9 shows the spring clip assemblies on the ends of the cable (Item 10) extending through the hollow bumper. A spring or elastic tensioner (Item 11) may be added to the cable to remove slack from the cable; however this is not required for use of the cable assembly.

Referring to FIG. 5, there is a perspective view showing a cable assembly rather than the locking clip assemblies. Items 2 and 3 show the extruded plastic assembly with magnets located inside the hollow tubes (Item 12) rather than the flexible magnetic strip attached to the base of the assembly. A metal spring or elastic tension strap can be added to provide a means of holding the spring clips to the car door.

DETAILED DESCRIPTION OF THE INVENTION

Figure 1:
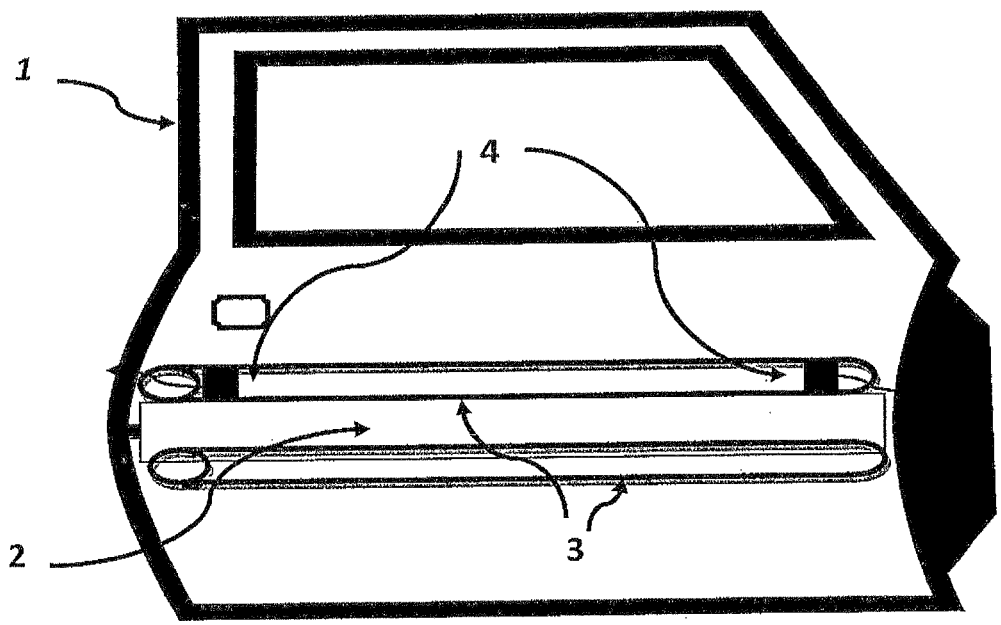
FIG. 1 is a perspective view of the vehicle molding apparatus attached to a car door.
Figure 2:
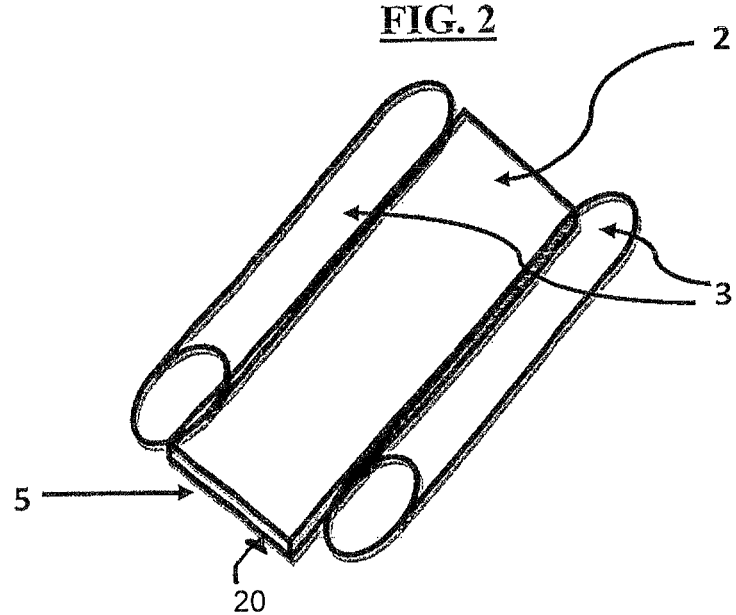
FIG. 2 is a perspective drawing showing the magnetic film attached to the assembly.
Figure 3:
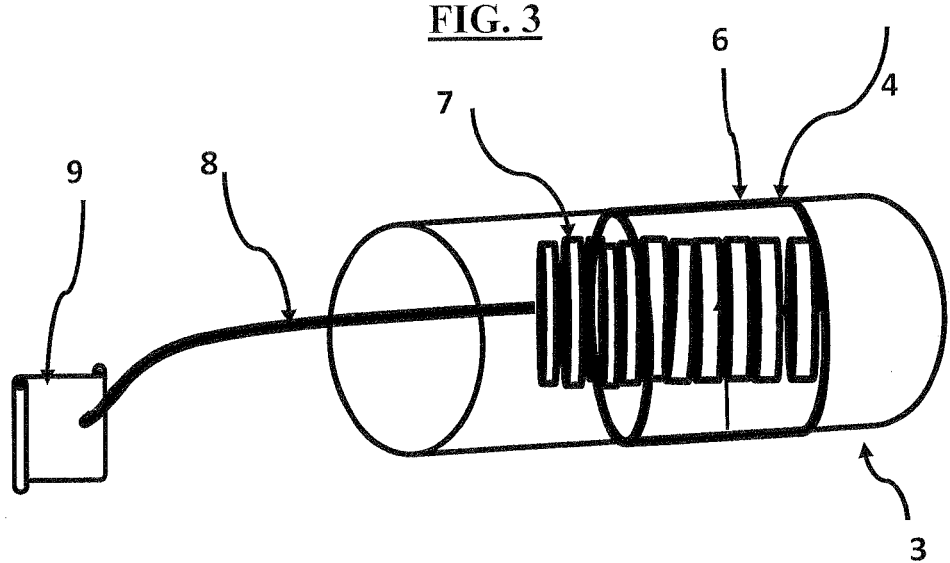
FIG. 3 is an exploded perspective view of the spring loaded locking mechanisms that attach the assembly to a car door.
Figure 4:
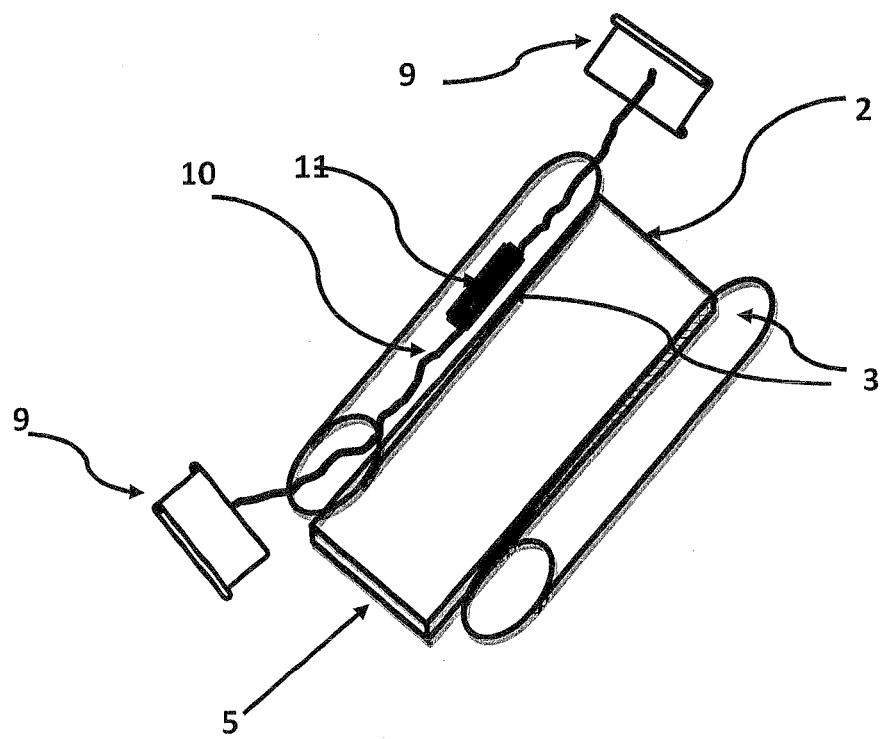
FIG. 4 is a perspective view with a locking cable through the hollow tube

The present invention relates to an extruded plastic assembly, which attaches to the sides or fronts of the vehicle using a flexible magnetic plate attached to base of the assembly and functions as a bumper on doors or other parts of the vehicle to prevent denting or scratch damage. The primary configuration of the extruded plastic assembly with magnetic attachment to the vehicle is such that it can be attached to any area of the vehicle where damage from other vehicles might occur such as the front or back or surfaces such as the sides of pickups or SUVs where no physical points of attachment might be present. The plastic assemblies are sized for each vehicle to allow car doors to be opened or closed with the assemblies attached and the vehicle can be moved from location with the protection attached or the protection can be left on permanently. The plastic assemblies will be provided in a range of generic or custom colors such that they will not be highly visible on the car.

Theft of the extruded plastic assembly can be prevented due to the use of spring loaded clips attached to the hollow-core, bumper tubes attached to the extruded plastic assembly or a cable with attached clips and an elastic or spring-loaded tensioner located inside one of the hollow tube that cannot be removed unless the car door is open. For some vehicles the theft protection assembly may not be required or cannot be attached to the vehicle at the location to be protected.

The present invention is primarily used in a parking lot where other vehicles are parked and where the occupants of an adjacent vehicle may open their vehicle door, resulting in a scratch or dent to the vehicle which is parked in the next space. The damage which results from occupants of a neighboring vehicle who negligently open their vehicle door upon another vehicle is significant. Vehicle owners who are concerned with the value of protecting the exterior surface of their vehicle from such an incident would appreciate the present invention.

Many vehicle owners are interested in a protection for the side of the vehicle which: is easy to adapt to their particular model of vehicle; is inexpensive; has an attractive design; can be easily stored away when not in use; and provides a substantial protective cushioning effect to offset the battering from the doors of other vehicles which may be opened toward the vehicle being protected. The present invention utilizes a unique arrangement of functional members to efficiently achieve these stated objectives.

It has been discovered, according to the present invention, that an extruded plastic assembly with tubes attached to the assembly, could provide all sides of the vehicle with durable damage protection that protects the vehicle from scratches or indentations from neighboring vehicles when the vehicle is parked.

It has also been discovered, according to the present invention, that the use of magnets, or a flexible magnetic film attach to the extruded plastic assembly uniquely allows the car to have the door protection either temporarily or permanently attached to the car and does not affect entry to the vehicle It has been additionally discovered, according to the present invention, that the extruded plastic assembly can be easily customized for specific vehicles including trucks and SUVs It has been further discovered, according to the present invention, that a simple locking mechanism can be utilized to easily attach the invention to the vehicle to prevent it from being stolen.

It is therefore an object of the present invention to furnish a durable cushioning which protects all sides of a parked vehicle from scratches or indentations which may be imposed by neighboring vehicles.

In the preferred embodiment of the present invention the removable side molding has a construction which includes the following features: an extruded plastic assembly, which attaches to the sides or fronts of the vehicle using magnets and functions as a bumper on doors or other parts of the vehicle to prevent damage from other automobiles on the front or sides of the protected vehicle. The primary configuration of the plastic assembly is such that it can be attached to any area of the vehicle where damage from other vehicles might occur such as the front or back or surfaces such as the sides of pickups or SUVs where no physical points of attachment might be present. The plastic assemblies are sized for each vehicle to allow car doors to be opened or closed with the assemblies attached and the vehicle can be moved from location with the protection attached or it can be left on permanently. The plastic assemblies will be provided in a range of generic or custom colors at the request of the purchaser.

Defined alternatively, the present invention is a removable vehicle molding, secured by magnets to the car door or other areas and can be locked into place with a simple spring clip assembly, to protect the vehicle from scratches and dents inflicted by nearby vehicles, comprising: (a) at least one section of extruded plastic tubes attached to a plate; (b) magnets to attach the assembly to the side of the vehicle and (c) a locking device that attaches to car doors and may or may not be used on other parts of the vehicle. The plastic assembly is configured so that it can be left on the car temporarily or permanently and is provided in a range of generic or custom colors.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

We claim:

1. A resilient vehicle side bumper comprising:
   an extruded plastic mounting plate having a flat surface;
   two or more hollow-core tubes, attached to the plate;
   a magnet attached to the flat surface of the extruded plate; and
   spring-loaded clips anchored within the hollow-core tubes, said clips having a shape and size to clip onto sides of a vehicle door to secure the bumper against removal unless the vehicle door is open, wherein the extruded plastic mounting plate and the two or more hollow-core tubes all have approximately the same length, are designed to contact with a surface of the vehicle and provide cushioning protection to the vehicle's surface.

2. The resilient vehicle side bumper of claim 1, wherein said plastic mounting plate comprises an extruded plastic plate.

3. The resilient vehicle side bumper of claim 1, wherein said hollow-core tubes comprise extruded plastic tubes.

4. The resilient vehicle side bumper according to claim 1, wherein said spring-loaded clips are mounted in pairs to a cable that passes through the hollow core of the tube.

5. The resilient vehicle side bumper according to claim 4, further including at least one of a spring and rubber tensioner for tensioning the cable.

6. The resilient vehicle side bumper according to claim 1, wherein the magnet comprises a magnetic film.

7. The resilient vehicle side bumper according to claim 4, further including a rubber tensioner for tensioning the cable.

* * * * *